United States Patent
Larzul (10) Patent No.: US 10,127,339 B2
(45) Date of Patent: Nov. 13, 2018

(54) EFFICIENT EMULATION OF CIRCUITS

(71) Applicant: Synopsys, Inc., Mountain View, CA (US)

(72) Inventor: Ludovic Marc Larzul, Folsom, CA (US)

(73) Assignee: Synopsys, Inc., Mountain View, CA (US)

(*) Notice: Subject to any disclaimer, the term of this patent is extended or adjusted under 35 U.S.C. 154(b) by 0 days.

(21) Appl. No.: 15/179,893

(22) Filed: Jun. 10, 2016

(65) Prior Publication Data
US 2017/0357743 A1     Dec. 14, 2017

(51) Int. Cl.
*G06F 17/50* (2006.01)

(52) U.S. Cl.
CPC .................. *G06F 17/5036* (2013.01)

(58) Field of Classification Search
CPC ............ G06F 17/5027; G06F 17/5036; G06F 2217/78; G01R 31/31703; G01R 31/31705; G01R 31/31723; G01R 31/3177
See application file for complete search history.

(56) References Cited

U.S. PATENT DOCUMENTS 8,103,497 B1 * 1/2012 Nemecek .............. G06F 11/261
703/14

* cited by examiner

*Primary Examiner* — Vuthe Siek
(74) *Attorney, Agent, or Firm* — Fenwick & West LLP (57) ABSTRACT

When a communication unit of an FPGA receives emulated signals of a design under test that are to be transmitted to another FPGA, the communication unit analyzes each signal to determine whether a signal event has occurred for the signal. The communication unit transmits to the other DUT FPGA a packet indicating for which signals a signal event has occurred. Subsequently, the communication unit transmits a packet for each signal for which an event has occurred.

20 Claims, 10 Drawing Sheets

EFFICIENT EMULATION OF CIRCUITS

BACKGROUND

1. Field of Art

The disclosure generally relates to the emulation of circuits, and more specifically to the communication between emulator components and the emulation of a memory.

2. Description of the Related Art

Emulators have been developed to assist circuit designers in designing and debugging highly complex integrated circuits. An emulator includes multiple field programmable gate arrays (FPGAs) (or other types of configurable components) that together can imitate the operations of a design under test (DUT). By using an emulator to imitate the operations of a DUT, designers can verify whether a DUT complies with various design requirements prior to fabrication.

In order for the emulator's FPGAs to be able emulate a DUT, the FPGAs must exchange signals. Each FPGA has a limited number of pads that can be used to communicate with other FPGAs. In certain situations the amount of signals that an FPGA needs to exchange with other FPGAs is more than the number of pads of the FPGA. In this situation at least one of the pads may be connected to a multiplexer, which receives multiple signals and outputs the signals one at a time through the pad. However, because the signals are being transmitted in consecutive order instead of at the same time, it results in the emulation time of the DUT being extended until all data are received in sequence.

Further, the number of memory ports (e.g., read and write ports) that an FPGA memory has in an emulator is limited. However, a DUT that is to be emulated may include a memory with more ports than those of the FPGA memory. As a result, the FPGA has to be configured in a way in which all of the memory ports of the DUT memory can be accommodated without overly extending the emulation time of the DUT.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Figure (FIG. 1 is a block diagram of an emulation environment, according to one embodiment.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. The figures depict embodiments of the disclosed system (or method) for purposes of illustration only. It should be recognized from the following description that alternative embodiments of the structures and methods illustrated herein may be employed without departing from the principles described herein.

Configuration Overview

A disclosed system (and method and computer program product) includes an emulation environment that efficiently emulates a design under test (DUT) in terms of communication between emulator field programmable gate arrays (FPGAs) and emulation of a memory.

One embodiment of the emulation environment includes a host system and an emulator. The host system generates information to configure the emulator to emulate a DUT. The emulator includes multiple FPGAs that collectively emulate the DUT based on the information provided by the host system. Certain FPGAs of the emulator are each configured to emulate a different partition of the DUT. The FPGAs that are configured or partially configured to emulate a DUT may be referred to as "DUT FPGAs."

Each DUT FPGA that is to exchange signals with other DUT FPGAs as part of emulating the DUT includes at least one communication unit for exchanging signals with the other FPGAs. In one embodiment, a DUT FPGA includes a different communication unit for each of the other DUT FPGAs that it exchanges signals with during emulation. For example, if a first DUT FPGA exchanges signals with a second DUT FPGA and a third DUT FPGA, the first DUT FPGA will include a communication unit for communicating with the second DUT FPGA and another communication unit for communicating with the third DUT FPGA. Similarly the second and third DUT FPGAs will each include a communication unit for communicating with the first DUT FPGA.

During emulation of the DUT, if a communication unit of a DUT FPGA receives signals that are to be transmitted to another DUT FPGA, the communication unit analyzes each signal to determine whether a signal event has occurred for the signal. In one embodiment, the signals are generated during a current clock cycle of a clock signal of the DUT and are generated based on the emulation of the DUT FPGA's respective DUT partition. In one embodiment, a signal event occurs for a signal if its current state is different than its state during the preceding clock cycle of the DUT clock signal (e.g., changed from a high state to a low state or vice versa).

The communication unit transmits to the other DUT FPGA a packet indicating for which signals a signal event has occurred during the current clock cycle. Subsequently, the communication unit transmits one or more packets for signals for which an event has occurred. The subsequent packets may include, for example, the respective signals. For example, assume the communication unit receives signals S0, S1, S2, and S3. Further, assume that the communication unit determines that a signal event has occurred for S1 and S3. The communication unit transmits to the other FPGA a first packet that indicates that an event has occurred for S1 and S3. Additionally, the communication unit will transmit a second packet that includes S1 and a third packet that includes S3. In other embodiments, instead of transmitting a different packet for each signal, which an event occurred on, the communication unit may include in a packet multiple signals for which signal events occurred.

Once the communication unit has transmitted the necessary packets to the other DUT FPGA, the communication unit transmits a ready signal to a ready unit. The ready signal indicates that the communication unit is finished transmitting signals and is ready to move on to the next clock cycle. The ready unit is included in the same DUT FPGA as the communication unit and receives ready signals from the different communication units of the FPGA.

In one embodiment, the ready unit also receives a ready signal from one or more memory units included in the DUT FPGA. A memory unit emulates a memory of the DUT (DUT memory) and the ready signal transmitted by the memory unit to the ready unit indicates whether the memory unit is ready to move on to the next clock cycle. The memory unit includes a memory with less memory ports than those of the DUT memory. The memory unit also includes a number of emulated ports that correspond to memory ports of the DUT memory. During the current clock cycle of the DUT, each of the emulated ports is analyzed to determine whether there is a memory event on the emulated port. For each of the emulated ports on which there is a memory event, the memory event is forwarded to one or more memory ports of the unit's memory. Once none of the emulated ports has a memory event, the memory unit transmits the ready signal to the ready unit indicating that it is ready to move on to the next clock cycle.

In one embodiment, when each of the ready signals received by the ready unit indicates being ready to move on to the next clock cycle, the ready unit transmits to a clock generator unit a next signal indicating that the DUT FPGA is ready to move to the next clock cycle. In one embodiment, when each of the ready signals indicates being ready to move on the next clock cycle, the ready unit waits a set period of time before transmitting the next signal to the clock generator. The ready unit waits the set period of time to make sure none of the ready signals change from indicating that they are ready to move on to indicating that the ready unit wait.

The clock generator unit generates the clock signal of the DUT. The clock generator unit may be a part of one the DUT FPGAs or a part of a separate emulator FPGA. The clock generator unit receives the next signals from the ready units of the DUT FPGAs. When the next signal from each of the DUT FPGAs indicates that the DUT FPGA is ready to move on to the next clock cycle, the clock generator unit starts the next clock cycle of the DUT through the clock signal.

Example Emulation Environment

Figure 1:
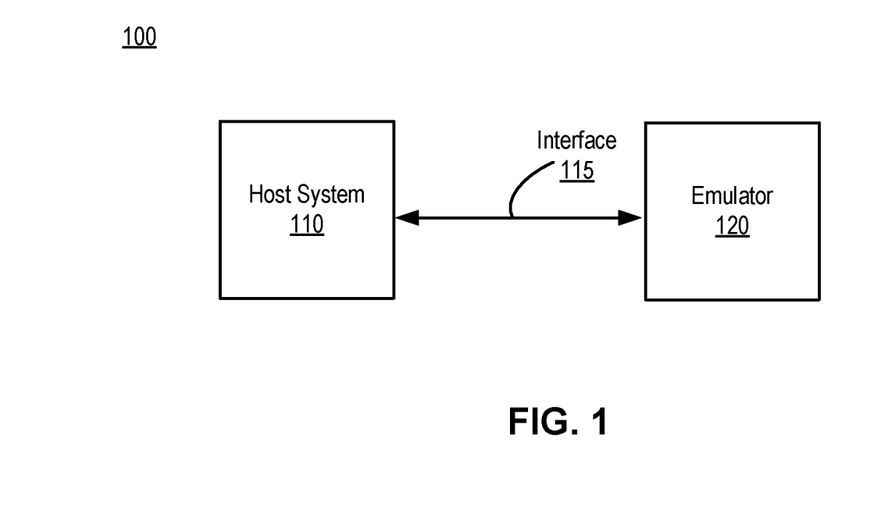

Figure (FIG. 1 is a block diagram illustrating an emulation environment 100, according to one embodiment. The emulation environment 100 includes a host system 110 and an emulator 120. The host system 110 communicates with the emulator 120 through an interface 115.

The host system 110 configures the emulator 120 for emulating a DUT. A DUT is one or more circuit designs that are to be emulated by the emulator 120. The host system 110 may be a single computer or a collection of multiple computers. In the embodiment where the host system 110 is comprised of multiple computers, the functions described herein as being performed by the host system 110 may be distributed among the multiple computers. The host system 110 may be indirectly connected to the emulator 120 through another device, computer or network.

The host system 110 receives (e.g., from a user or another system) a description of a DUT to be emulated. In one embodiment, the description of the DUT is in a type of hardware description language (HDL), such as register transfer language (RTL). The host system 110 synthesizes the HDL description of the DUT to creates a gate level netlist. In another embodiment, the description of the DUT received from the user is a gate level netlist.

The host system 110 analyzes the gate level netlist and identifies in the gate level netlist components of the DUT that are not available in the emulator 120. For each component not available in the emulator 120, the host system 110 assigns a corresponding component available in the emulator 120. In one embodiment, if the DUT includes a memory (DUT memory) with more memory ports than those of the emulator 120, the host system 110 edits the gate level netlist to include a memory unit instead of the DUT memory. The memory unit includes a memory available in the emulator 120, at least one multiplexer, at least one event detector, a controller, and emulated ports. The number of memory ports of the unit's memory are less than those of the DUT memory. A memory port may be, for example, a read or write port. The number of emulated ports corresponds to the number of memory ports of the DUT memory.

Emulated ports are connected to the multiplexer as inputs and an output of the multiplexer is connected to one or more memory ports of the unit's memory. During a clock cycle of the DUT clock signal, the event detector determines which of the emulated ports have a memory event. The multiplexer is then controlled so that only the emulated ports that have memory events are selected and the data received by those ports is output by the multiplexer to the unit's memory. For example, if there are ten emulated ports and only two have memory events, instead of the multiplexer selecting and outputting each of the ten emulated ports, the multiplexer will only select the two emulated ports with events.

The controller outputs a ready signal once the emulated ports with events have been selected and output data positioned on the ports. The ready signal indicates that the memory unit is ready to move on the next clock cycle. By analyzing the emulated ports for memory events and only selecting the emulated ports with memory events it allows the emulator 120 to move on to the next clock cycle faster. For example, continuing with the example from above with the ten emulated ports, selecting only the two emulated ports with events is faster than selecting and outputting each of the ten emulated ports.

Based on the gate level netlist for the DUT, the host system 110 partitions the DUT into multiple partitions and maps each partition to an FPGA included in the emulator 120. In one embodiment, with each partition of an FPGA, the host system 110 includes at least one communication unit and a ready unit. The communication unit is used by the partition to communicate with one or more other FPGAs during emulation of the DUT.

During emulation of the DUT, if a communication unit receives signals from its respective partition to transmit to another FPGA, the communication unit determines for which of the received signals a signal event has occurred during the current clock cycle. The communication unit transmits to the other FPGA a packet indicating for which of the signals an event has occurred. After transmitting the initial packet, the communication unit transmits to the other FPGA a packet for each signal for which an event occurred. Each of the packets includes information associated with its respective signal.

Once a packet has been transmitted for each signal for which a signal event occurred, the communication unit outputs a ready signal to the ready unit indicating that it is ready to move on to the next clock cycle. By the communication unit analyzing the received signals for signal events and only transmitting the signals for which an event occurred, it allows the emulator 120 to move on to the next clock cycle faster. In another embodiment, a packet may contain more than a signal to be transmitted, or even some extra signals that did not get an event but are part of the same packet and selected because another signal got an event. In another embodiment, different packets can have different sizes.

For example, assume fifteen signals are received by the communication unit and for only three of the signals an event occurred. If the fifteen signals are consecutively transmitted by the communication unit to the other FPGA (e.g., using a multiplexer), it would take fifteen clock cycles of a clock at which the communication unit is operating. This clock is faster than the clock of the DUT so that the fifteen signals can be transmitted prior to the next clock cycle of the DUT. However, by analyzing the received signals for signal events, the communication unit only has to transmit four packets. The first packet indicating the three signals for which an event occurred and one packet for each of the three signals. Transmitting the four packets would take only four clock cycles compared with the fifteen cycles if the fifteen signals were transmitted.

The ready unit receives ready signals from components of its respective FPGA. If each received ready signal indicates that the respective component is ready to move on the next clock cycle, the ready unit outputs a next signal so that the next clock cycle can be started.

After the synthesis, partitioning, and mapping, the host system 110 generates bit streams which include information to configure the emulator 120 to emulate the DUT. A bit stream may include, for example, a design description of one or more partitions of the DUT, mapping information (e.g., mappings of partitions to FPGAs), information as to additional component to be emulated by the emulator FPGAs, placement and routing information, design constraints for the DUT, etc. Upon request from a user, the host system 110 transmits the one or more bit streams to the emulator 120 via the interface 115 to configure the emulator 120 to emulate the DUT.

The emulator 120 is a hardware system that emulates DUTs. The emulator 120 includes FPGAs that can be configured to collectively emulate a DUT. In other embodiments, instead of FPGAs, the emulator 120 includes other types of configurable components to emulate DUTs. The emulator 120 receives from the host system 110 one or more bit streams for a DUT that is to be emulated. Based on the bit streams, the emulator 120 configures the FPGAs to perform the functions of the DUT. The emulator 120 emulates the DUT using the FPGAs.

The interface 115 is a communication medium that allows communication between the host system 110 and the emulator 120. In one embodiment, the interface 115 is one or more cables with electrical connections. For example, the interface 115 may be one or more RS232, USB, LAN, optical, or custom built cables. In other embodiment, the interface 115 is a wireless communication medium or a network with one or more points of access. For another example, the interface 115 may be a wireless communication medium employing a Bluetooth® or IEEE 802.11 protocol.

Figure 2:
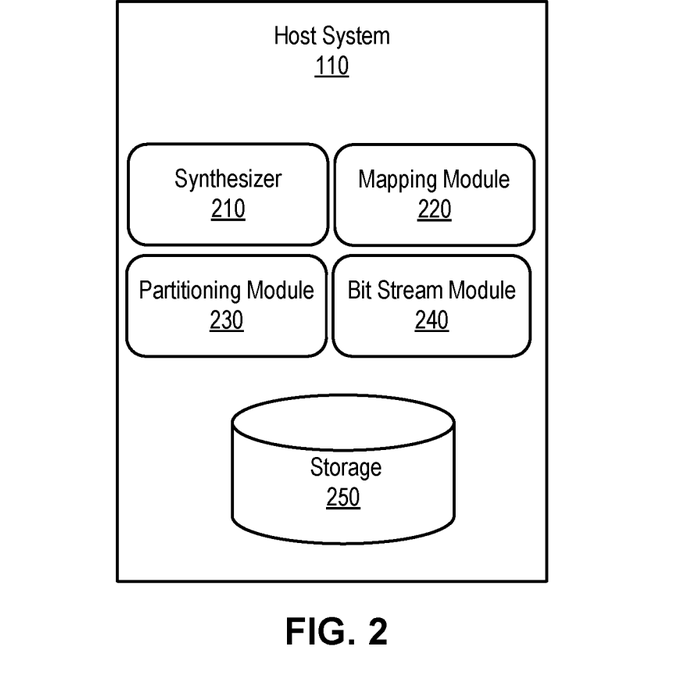
FIG. 2 is a block diagram illustrating a host system, according to one embodiment.

FIG. 2 is a block diagram illustrating the host system 110 in more detail, according to one embodiment. The host system 110 includes a synthesizer 210, mapping module 220, partitioning module 230, bit stream module 240, and storage 250. Each of these components may be embodied as hardware, software, firmware, or a combination thereof. Each of these components may be optional and other components may exist in complement. Some processing described hereafter may be done by other components or in a different order without changing the principle of the embodiments described herein.

The synthesizer 210 converts HDL descriptions of DUTs into gate level logic. For a DUT that is to be emulated, the design compiler 210 receives a description of the DUT. If DUT description is received in HDL, the synthesizer 210 synthesizes the HDL description to create a gate level netlist of the DUT.

The mapping module 220 maps components of the DUT to components available in the FPGAs of the emulator 120. For the DUT, the mapping module 220 identifies components included in the gate level netlist that are not available in the emulator FPGAs. For each of the identified components, the mapping module 220 assigns a corresponding component that is available in an emulator FPGA and modifies the gate level netlist based on the assignment.

In one embodiment, if DUT includes a memory, the mapping module 220 determines from the gate level netlist the number of memory ports of the memory. If the number of memory ports is more than the memory ports of the memories available in the emulator FPGAs, the mapping module 220 modifies the gate level netlist to include a memory unit instead of the DUT memory. The memory unit will perform the same functions as the DUT memory. The memory unit includes a memory available in the emulator FPGAs. The memory unit is described in more detail with reference to FIG. 6.

The partitioning module 230 partitions the DUT and maps the partitions to emulator FPGAs. The partitioning module 230 partitions the DUT at the gate level into a number of partitions using the DUT's gate level netlist. The partitioning module 230 maps each partition to one or more FPGAs of the emulator 120. The partitioning module 230 performs the partitioning and mapping using design rules, design constraints (e.g., timing or logic constraints), and information about the emulator 120.

For each FPGA to which a partition is mapped, the partitioning module 230 also maps to the FPGA a ready unit and at least one communication unit. The ready unit indicates when the components of the FPGA are ready to move to a next clock cycle of the DUT clock signal during emulation. The communication unit is used by the partition to communicate with other FPGAs. In one embodiment, for each FPGA with which the partition communicates during emulation of the DUT, a different communication unit is included for communicating with the FPGA. More details of the ready unit and the communication unit are described below with reference to FIGS. 3A, 4, and 5.

Bit stream module 240 generates bit streams including information to configure the emulator 120 to emulate the DUT. The bit streams may include, for example, a description of the partitions generated by the partitioning module 230, information generated by the partitioning module 230 as to which FPGA each partition is mapped to, information as to additional components to be emulated by the emulator FPGAs, placement and routing information, design constraints for the DUT, etc.

The bit stream module 240 stores the bit streams in the storage 250. If a request is received from a user to transmit the bit streams to the emulator 120, the bit stream module 240 transmits the bit streams to the emulator 120 to configure the emulator 120 to emulate the DUT.

Communication Between FPGAs

Figure 3A:
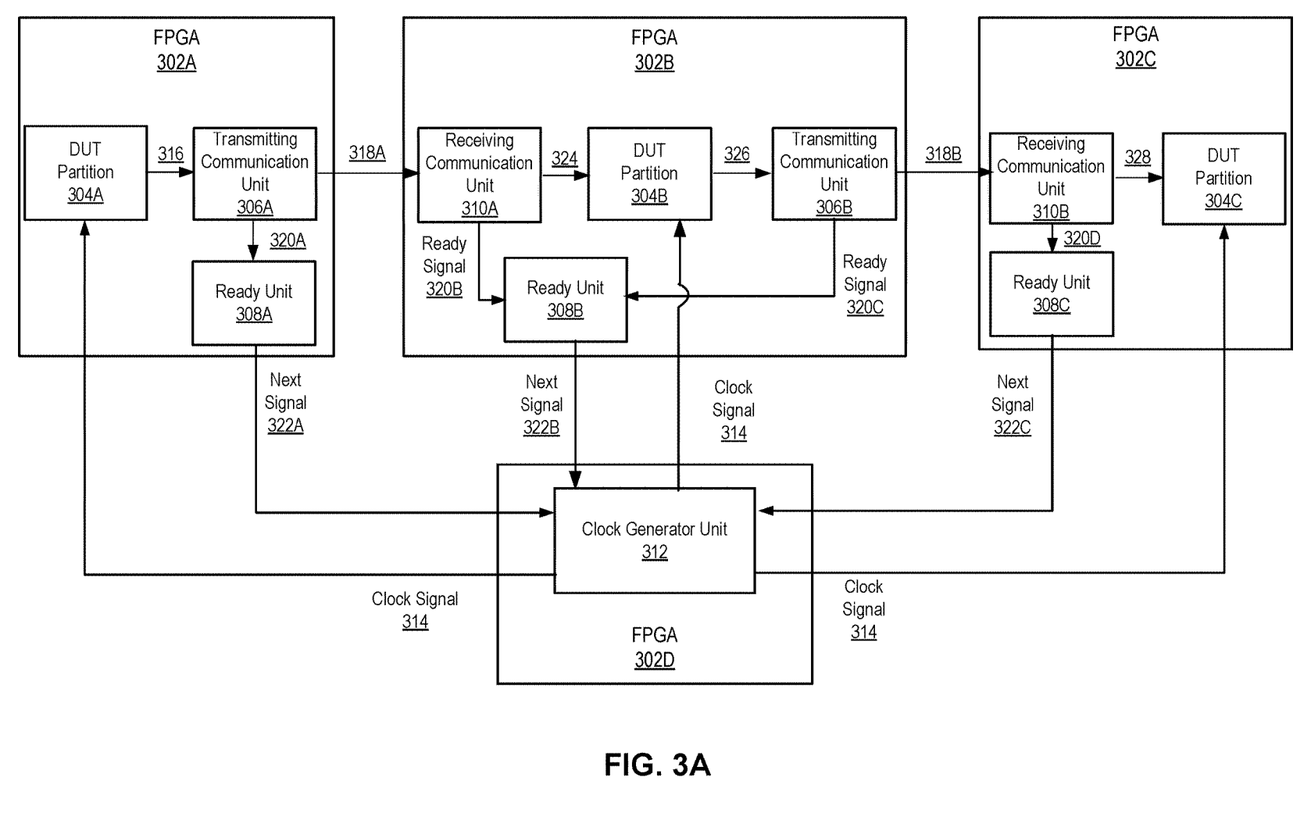
FIG. 3A is a block diagram illustrating an emulator, according to a first embodiment.

FIG. 3A illustrates a configuration of the emulator 120 to emulate a DUT. The emulator 120 is configured based on bit streams received from the host system 110. In this example, the emulator 120 includes FPGAs 302A, 302B, 302C, and 302D. In this example only four FPGAs 302 are illustrated for purposes of simplicity. However, in other embodiments the emulator 120 will include many more FPGAs 302. Further, in this example, the DUT comprises DUT partitions 304A, 304B, and 304C. Each of the FPGAs 302 may also include more communication units either for receiving or transmitting signals to other FPGAs 302.

FPGA 302A is configured to emulate DUT partition 304A, transmitting communication unit 306A, and ready unit 308A. Transmitting communication unit 306A is used by the DUT partition 304A to transmit signals to FPGA 302B. Ready unit 308A indicates when the transmitting communication unit 306A is finished transmitting signals and ready to move on to a next clock cycle of the DUT.

FPGA 302B is configured to emulate DUT partition 304B, receiving communication unit 310A, transmitting communication unit 306B, and ready unit 308B. Receiving communication unit 310A receives signals from FPGA 302A and provides the signals to DUT partition 304B. Transmitting communication unit 306B is used by the DUT partition 304B to transmit signals to FPGA 302C. Ready unit 308B indicates when the receiving communication unit 310A and the transmitting communication unit 306B are ready to move on to the next clock cycle of the DUT.

FPGA 302C is configured to emulate DUT partition 304C, receiving communication unit 310B, and ready unit 308C. Receiving communication unit 310B receives signals from FPGA 302B and provides the signals to DUT partition 304C. Ready unit 308C indicates whether the receiving communication unit 310B is finished receiving signals and ready to move on to the next clock cycle of the DUT.

FPGA 302D is configured to emulate clock generator unit 312. The clock generator unit generates clock signal 314 of the DUT which is received by DUT partitions 304A, 304B, and 304C. When a new clock cycle starts for the clock signal 314 or when the clock signal 314 changes states, this may be referred to as a clock event of the clock signal 314. A clock cycle includes one or more time segments. In other embodiments, FPGA 302D may also be configured to emulate a DUT partition 304. In another embodiment, multiple clock generator units can exist in different FPGAs 302, each of those clock generator units can generate clocks for one or more FPGAs 302 based on received next signals 322. In another embodiment, some clock generator units can relay next signals 322 to other clock generator units located on the same or other FPGAs 302, either as a set of next signals 322 or as a reduced numbers of next signals 322.

In one embodiment, during a clock cycle of the clock signal 314, DUT partition 304A outputs signals 316 to transmitting communication unit 306A. The signals 316 are intended for FPGA 302B. The transmitting communication unit 306A analyzes each of the signals 316 and determines for which of the signals 316 a signal event has occurred during the current clock cycle. In one embodiment, a signal event occurs for a signal if the state of the signal during the current clock cycle is different than its state in the preceding clock cycle (e.g., changed from a high state to a low state or vice versa).

The transmitting communication unit 306A transmits a packet to FPGA 302B via connection 318A indicating the signals for which an event has occurred during the current clock cycle. Subsequently, the communication unit transmits a packet for each signal for which an event has occurred. The packet includes the respective signal. The packets are transmitted in consecutive order with or without specific order.

Once the transmitting communication unit 306A is finished transmitting the packets to DUT FPGA 302B, the transmitting communication unit 306A outputs to the ready unit 308A a ready signal 320A indicating that the transmitting communication unit 306A is finished transmitting signals and ready to move on to the next clock cycle. Based on the ready signal 320A, ready unit 308A outputs a next signal 322A to FPGA 302D indicating that FPGA 302A is ready to move on to the next clock cycle.

The receiving communication unit 310A receives the packets from FPGA 302A via connection 318A. Based on the first packet which indicates the signals for which an event has occurred, the receiving communication unit 310A determines the signals included in the subsequent packets and forwards the signals 324 to the appropriate circuitry of the DUT partition 304B. After forwarding the signals 324 to the DUT partition 304B, the receiving communication unit 310A outputs a ready signal 320B to the ready unit 308B indicating that it is ready to move on to the next clock cycle. The DUT partition 304 receives the signals 324 and generates additional signals 326 based on the received signals 324. The DUT partition 304B outputs the signals 326 to transmitting communication unit 306B for transmission to FPGA 302C.

Similar to transmitting communication unit 306A, transmitting communication unit 306B determines for which of the signals 326 a signal event has occurred during the current clock cycle. The transmitting communication unit 306B transmits a packet to FPGA 302C via connection 318B indicating the signals for which an event has occurred and then transmits a packet for each signal for which an event has occurred.

Once the transmitting communication unit 306B is finished transmitting the packets to DUT FPGA 302C, the transmitting communication unit 306B outputs to the ready unit 308B a ready signal 320C indicating that it is ready to move on to the next clock cycle. Based on each of the ready signals 320B and 320C indicating that it is ready to move on to the next clock cycle, the ready unit 308B outputs a next signal 322B to FPGA 302D indicating that FPGA 302B is ready to move on to the next clock cycle.

In one embodiment, the ready unit 308B waits for the ready signals 320B and 320C to both indicate that they are ready to move on for a set period of time before outputting the next signal 322B. The ready unit 308B waits the set period of time to make sure one of the units does not still have to perform a task during the current clock cycle. For example, when DUT partition 304B receives signals 324 and prior to DUT partition 304B outputting signals 326, the receiving communication unit 310A and the transmitting communication unit 306B may both indicate that they are ready to move on. However, once transmitting communication unit 306B receives signals 326, transmitting communication unit 306B may change the ready signal 320C to indicate that it is not ready to move on. Hence, by waiting the set period of time, the ready unit 308B will not cause the clock generator unit 312 to move on to the next clock cycle while tasks still need to be performed during the current clock cycle.

The receiving communication unit 310B receives the packets from FPGA 302B via connection 318B. Based on the first packet which indicates the signals for which an event has occurred, the receiving communication unit 310B determines the signals included in the subsequent packets and forwards the signals 328 to the appropriate circuitry of the DUT partition 304C. After forwarding the signals 328 to the DUT partition 304C, the receiving communication unit 310B outputs a ready signal 320D to the ready unit 308C indicating that it is ready to move on to the next clock cycle. Based on the ready signal 320D, ready unit 308C outputs a next signal 322C to FPGA 302D indicating that FPGA 302C is ready to move on to the next clock cycle.

The clock generator unit 312 receives the next signals 322A, 322B, and 322C. When each of the next signals 322 indicates that its respective FPGA 302 is ready to move on to the next clock cycle, the clock generator unit 312 outputs the next clock cycle through the clock signal 314. In one embodiment, the clock generator unit 312 waits for the next signals 322 to all indicate that they are ready to move on for a set period of time before outputting the next clock cycle. Similar to ready unit 308B, the clock generator unit 312 waits the set period of time to make sure none of the FPGAs 302A, 302B, and 302C still has to perform a task during the current clock cycle. In a different embodiment, the clock generator unit 312 waits on only a subset of the FPGAs 302.

Figure 3B:
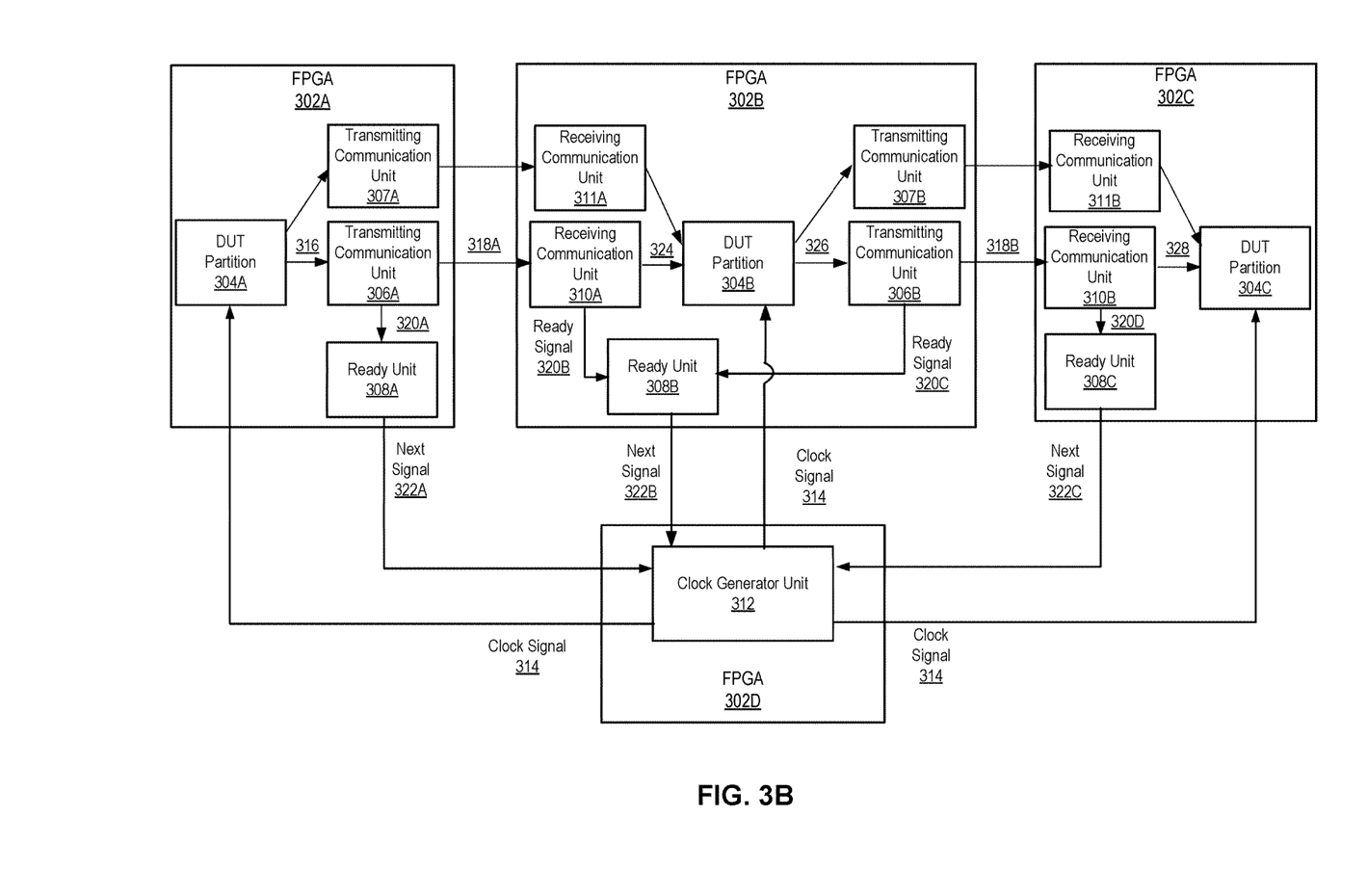
FIG. 3B is a block diagram illustrating an emulator, according to a second embodiment.

In some situation, a communication based on detecting events is not faster than a simple multiplexing of signals or the direct transmission of signals to another FPGA 302. In addition to including the transmitting and receiving communication units 306 and 310 described above, it is possible to include communication units that do no transmit signals based on detected events. For example, FIG. 3B illustrates the FPGA 302 including transmitting communication unit 307A, FPGA 302B including receiving communication unit 311A and transmitting communication unit 307B, and FPGA 302C including receiving communication 311B in addition to the components described for FIG. 3A. The communication units 307A, 307B, 311A, and 311B do not output ready signals because they simply output signals received to achieve transmission every clock cycle without requiring to extend a clock cycle.

Figure 4:
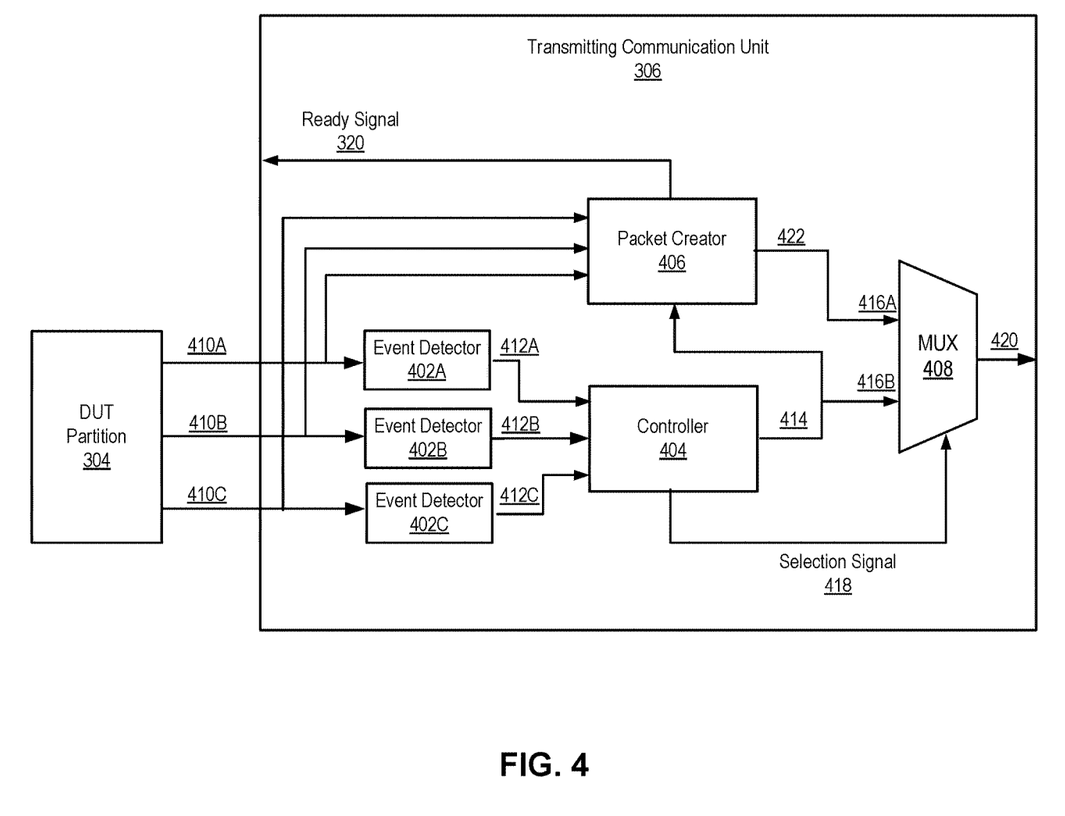
FIG. 4 is a circuit diagram of a transmitting communication unit, according to one embodiment.

FIG. 4 is a circuit diagram of a transmitting communication unit 306, such as the transmitting communication units 306A and 306B of FIGS. 3A and 3B. Assume for purposes of this example that the transmitting communication unit 306 and a DUT partition 304 are emulated by an FPGA 302. The FPGA 302 is connected to another FPGA 302 to which the transmitting communication unit 306 transmits signals.

The transmitting communication unit 306 includes event detectors 402A, 402B, and 402C, controller 404, packet creator 406, and multiplexer (MUX) 408. Each event detector 402 receives as an input a signal 410 generated by the DUT partition 304. In this example, event detector 402A receives signal 410A, event detector 402B receives signal 410B, and event detector 402C receives signal 410C. The signals 410 are intended for the other FPGA 302. Each event detector 402 determines whether a signal event has occurred during the current clock cycle for the signal 410 received and outputs a signal 412 indicating whether a signal event has occurred. Specifically, each event detector 402 compares the current state of the received signal 410 to the state of the signal 410 in the preceding clock cycle. The state of the signal 410 in the preceding clock cycle may be stored, for example, in a register of the event detector 402. If the current state of the signal 410 is the same as the state from the preceding clock cycle, the signal 412 output by the event detector 402 indicates that no signal event has occurred during the current clock cycle. However, if the current state of the signal 410 is different than the state from the preceding clock cycle, the output signal 412 indicates that a signal event has occurred. Each event detector 402 stores the current state of the signal 410 for the next clock cycle (e.g., replace in the register the prior state with the current state).

The controller 404 receives as inputs the signals 412 output by the event detectors 402. Based on the signals 412, the controller 404 determines for which of the signals 410 a signal event occurred during the current clock cycle. The controller 404 generates a packet (indicating packet) indicating for which of the signals 410 a signal event occurred. In one embodiment, the indicating packet includes an identifier (e.g., a number) that identifies the packet. The controller 404 outputs the indicating packet 414 to input 416B of MUX 408 and to the packet creator 406. The controller 404 also outputs a selection signal 418 to the MUX 408 with a state that causes the MUX 408 to select input 416B and output the indicating packet 414 through a connection 420 with the other FPGA 302. Once the indicating packet 414 has been output by the MUX 408, the controller 404 changes the selection signal 418 so that the MUX 408 outputs data received by input 416A of the MUX 408.

The packet creator 406 receives the signals 410 output by the DUT partition 304 and the indicating packet 414. Based on the indicating packet 414, the packet creator 406 creates a packet for each of the signals 410 for which a signal event has occurred. In one embodiment, the packet created for a signal 410 for which an event has occurred includes the signal 410 and an identifier to identify the packet. The packet creator 406 outputs the packets 422 in consecutive order to input 416A of the MUX 408. Based on the selection signal 418, the MUX 408 outputs the packets 422 to the other FPGA 302 through the connection 420. After the packet creator 406 outputs the packets 422, the packet creator 406 outputs a ready signal 320 to its respective ready unit 308 so that it can indicate that the transmitting communication unit 306 is ready to move on to the next clock cycle. In other embodiments, the ready signal 320 is output by the controller 404.

Figure 5:
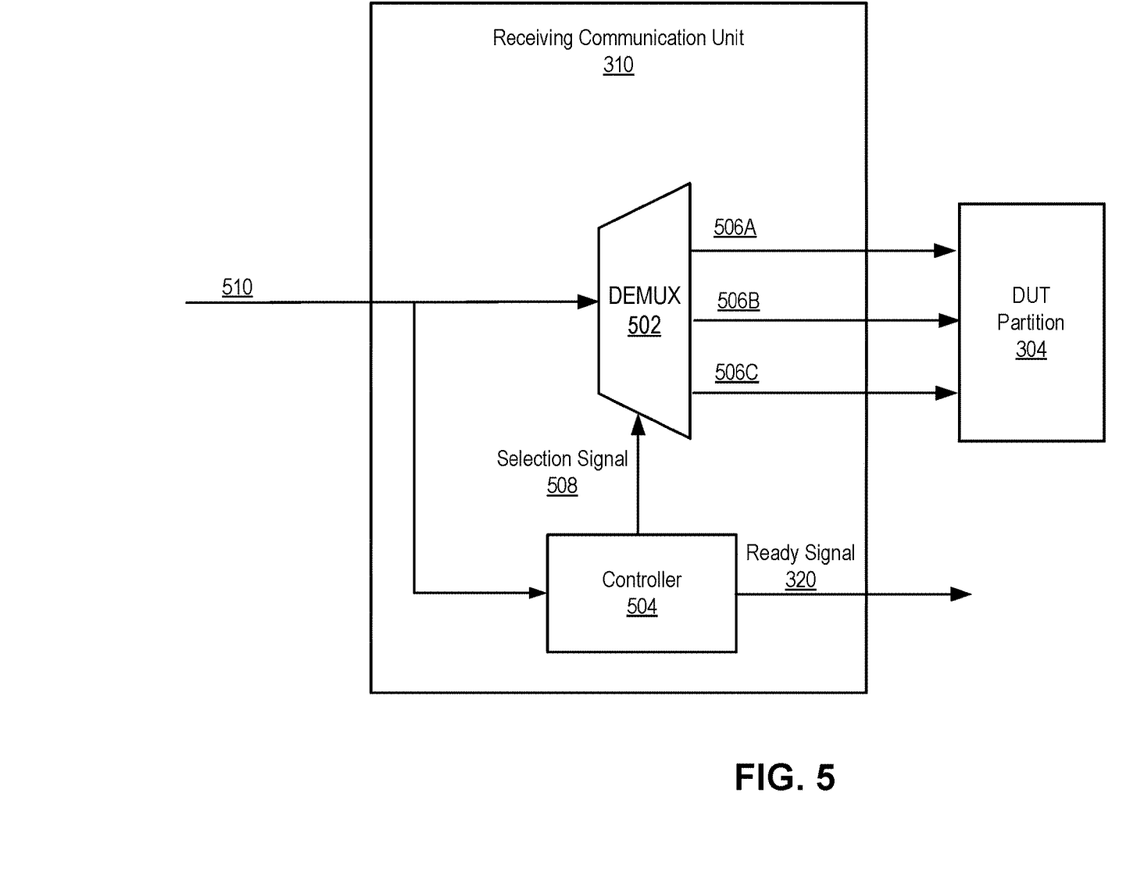
FIG. 5 is a circuit diagram of a receiving communication unit, according to one embodiment.

FIG. 5 is a circuit diagram of a receiving communication unit 310, such as the receiving communication units 310A and 310B of FIGS. 3A and 3B. Assume for purposes of this example that the receiving communication unit 310 and a DUT partition 304 are emulated by an FPGA 302. The FPGA 302 is connected to another FPGA 302 and receives packets from the other FPGA 302.

The receiving communication unit 310 includes a demultiplexer (DEMUX) 502 which includes three outputs 506A, 506B, and 506C connected to different circuitry of the DUT partition 304. The receiving communication unit 310 also includes a controller 504 that controls the DEMUX 502 using a selection signal 508 that is output to the DEMUX 502.

The DEMUX 502 and the controller 504 receive in consecutive order packets 510 transmitted by the other FPGA 302. A first packet received is an indicating packet that indicates for which signals emulated by the other FPGA 302 a signal event has occurred during the current clock cycle. Based on the indicating packet, the controller 504 determines information as to which signal each of the subsequent packets corresponds. For each of the subsequent packets, the controller 504 modifies the selection signal 508 based on the determined information so that the DEMUX 502 outputs the packet through the appropriate output 506 and to the appropriate circuitry of the DUT partition 304.

For example, assume that the indicating packet received indicates that a signal event occurred for signal S1. Based on the information included in the indicating packet, the controller 504 determines that the next packet received will be for signal S1. The controller 504 determines that the packet for S1 should be output through output 506B. The controller 504 then outputs to the DEMUX 502 the appropriate data for selection signal 508 so that the DEMUX 502 outputs the packet received for S1 through output 506B. In other embodiments, the DEMUX 502 is implemented in different ways than a demultiplexer, like a shift register or multiple shift registers, or "shadow" registers.

The transmitting communication units 306 and the receiving communication units 310 have been shown as being separate. However, it should be understood that if an FPGA 302 was transmitting and receiving signals from another FPGA 302, the FPGA 302 could include a communication unit that includes the components of a transmitting communication unit 306 as shown in FIG. 4 and the components of a receiving communication unit 310 as shown in FIG. 5. In other embodiments, the FPGA 302 could include separately a transmitting communication unit 306 and a receiving communication unit 310.

Memory Emulation

Figure 6:
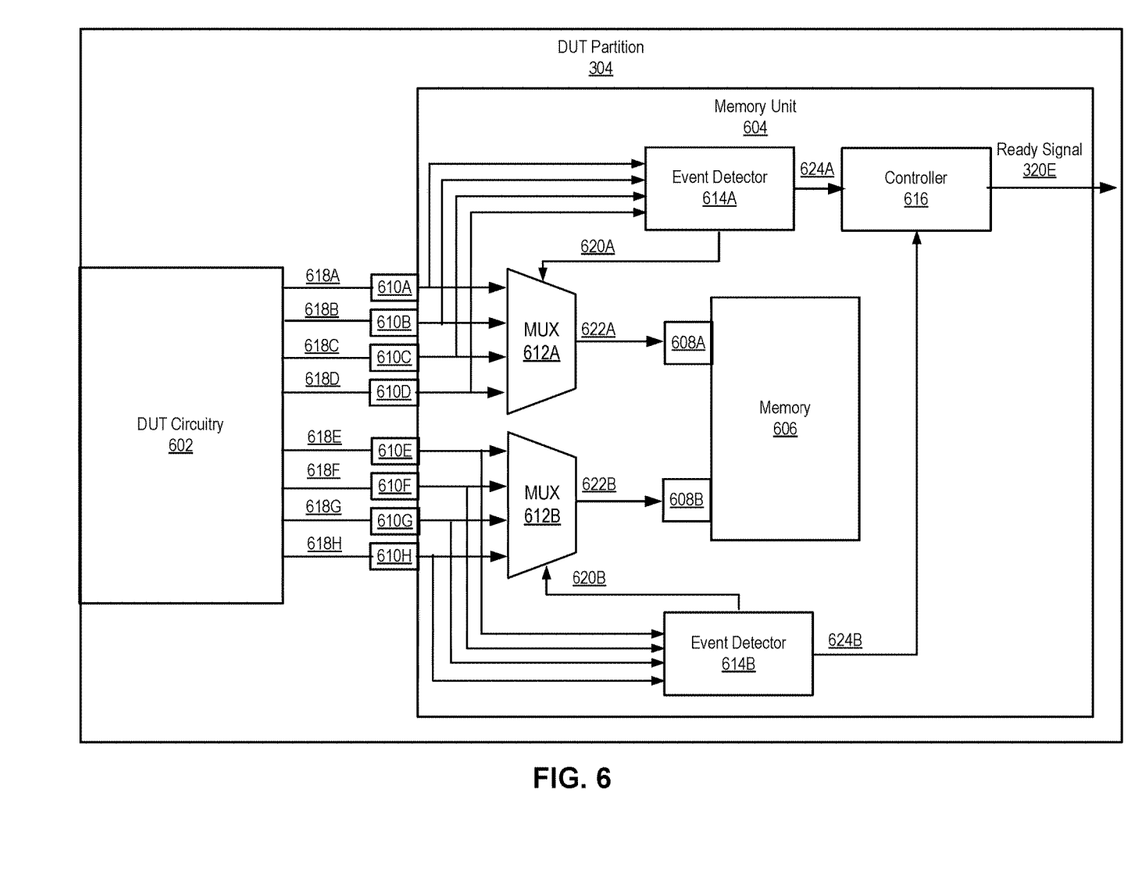
FIG. 6 is a circuit diagram of an emulated DUT partition, according to one embodiment.

FIG. 6 is a circuit diagram of a DUT partition 304 emulated by an FPGA 302 of the emulator 120. The DUT partition 304 includes DUT circuitry 602 and a memory unit 604. The DUT circuitry 602 is emulated circuitry of a DUT. The memory unit 604 includes a memory 606 which is part of the FPGA 302. In this example, the memory 606 includes two memory ports 608A and 608B and the memory unit 604 is emulating a memory with eight ports. As a result the memory unit 604 includes eight emulated ports 610A-610H. Additionally, the memory unit 604 includes two MUXs 612A and 612B, two event detectors 614A and 614B, and a controller 616.

Each of the emulated ports 610 is connected to the DUT circuitry 602 through a respective connection 618. Specifically, emulated port 610A is connected to the DUT circuitry 602 through connection 618A, emulated port 610B is connected to the DUT circuitry 602 through connection 618B, and so on. During a clock cycle, each of the emulated ports 610 can receive data from the DUT circuitry intended for the memory 606. If any port from emulated ports 610A-610D receives data during the current clock cycle, the emulated port 610 forwards the data to MUX 612A and event detector 614A as inputs. If any port from emulated ports 610E-610H receives data during the current clock cycle, the emulated port 610 forwards the data to MUX 612B and event detector 614B as inputs.

Based on the inputs, each event detector 614 determines for which of its respective emulated ports 610 a memory event has occurred during the current clock cycle. In one embodiment, a memory event has occurred for an emulated port 610, if the emulated port receives data during the current clock cycle. The data received may be, for example, a memory address, a control signal, or data to be stored in the memory 606.

The event detector 614A outputs a selection signal 620A to MUX 612A to cause MUX 612A to select from emulated ports 610A-610D, the ports 610 for which a memory event occurred. When an emulated port 610 is selected, the MUX 612A outputs the data received by the port 610 through output 622A to memory port 608A of the memory 606. For example, if emulated ports 610B and 610C had memory events during the current clock cycle, the event detector 614 will only have the MUX 612A select emulated ports 610B and 610C. The MUX 612A will not waste time in selecting emulated ports 610A and 610D since no memory event occurred during the current clock cycle. This helps the emulator 120 move on to the next clock cycle faster.

Similarly, event detector 614B outputs a selection signal 620B to MUX 612B to cause MUX 612B to select from emulated ports 610E-610H, the ports 610 for which a memory event occurred. When an emulated port 610 is selected, the MUX 612B outputs the data received by the port 610 through output 622B to memory port 608B of the memory 606.

When a MUX 612 is finished outputting the data for the ports 610 for which memory events occurred, its respective event detector 614 outputs a signal 624 to the controller 616 indicating that is ready to move on to the next clock cycle. Event detector 614A outputs signal 624A to the controller 616 and event detector 614B outputs signal 624B to the controller 616. The controller 616 outputs a ready signal 320E when both signals 624A and 624B indicate that they are ready to move on to the next clock cycle. The ready signal 320E is output to a ready unit 308 included on the same FPGA 302 as the DUT partition 304. The ready signal 320E indicates that the memory unit 604 is ready to move on to the next clock cycle.

In another embodiment, the MUXs 612 output multiple signals 622 going to one or multiple memories 606, each of the signals 622 can be controlled to take any of the inputs 610. In this case, the full events from the DUT circuitry 602 can be processed in a minimum number of cycles regarding the number of ports 608 on all the memories 606.

Figure 7:
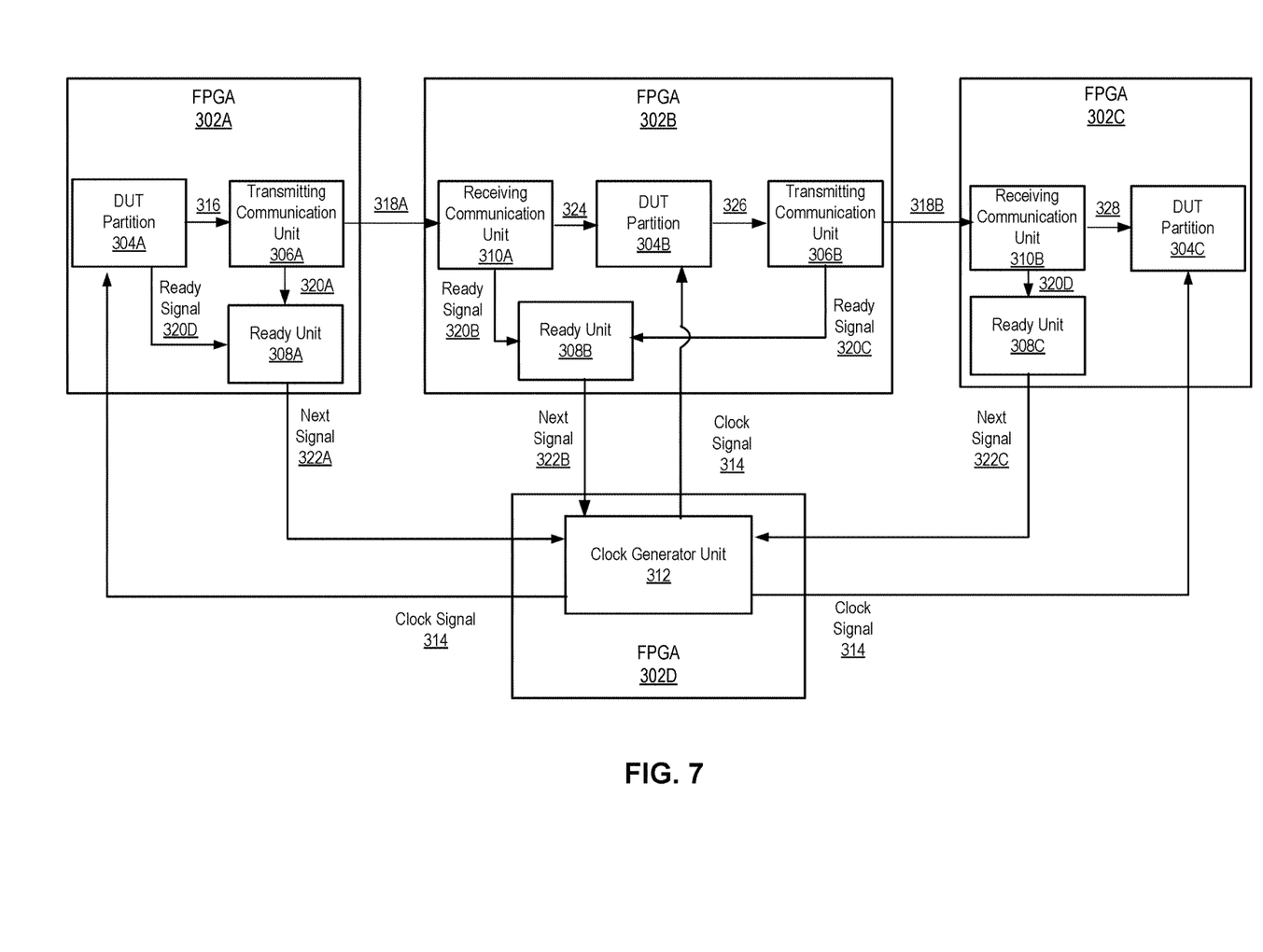
FIG. 7 is a block diagram illustrating an emulator, according to a third embodiment.

FIG. 7 illustrates the DUT partition 304 of FIG. 6 in an emulator system environment as DUT partition 304A. DUT partition 304A is included in FPGA 302A. As can be seen ready signal 320D output by the memory unit 604 of FIG. 6 is received by ready unit 308A. The ready unit 308A also receives ready signal 320A as described above with reference to FIG. 3A. When ready signals 320A and 320D both indicate that they are ready to move on to the next clock cycle, the ready unit 308A outputs the next signal 322A to indicate that FPGA 302A is ready to move on to the next clock cycle. The functionality of the other components is as described above with reference to FIG. 3A. In other embodiments, there can be many ready signals 320D from the same DUT partition 304A as well as many 320A signals.

Processes

Figure 8:
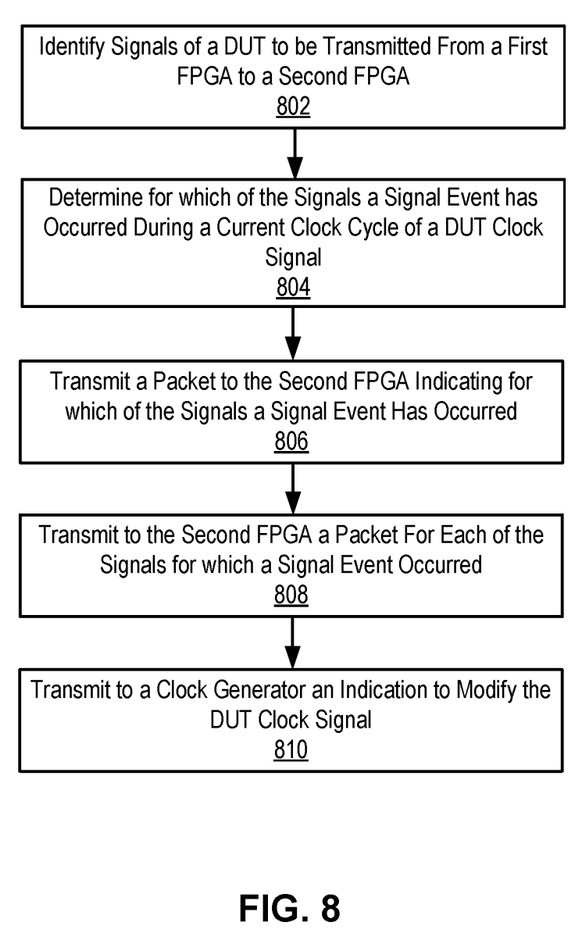
FIG. 8 is a flow chart of a process for transmitting signals, according to one embodiment.

FIG. 8 is a flow chart of a process for a first FPGA of the emulator 120 to transmit signals to a second FPGA of the emulator 120, according to one embodiment. Other embodiments can perform the steps of FIG. 8 in different orders. Moreover, other embodiments can include different and/or additional steps than the ones described here.

Assume for purposes of this example that the emulator 120 is emulating a DUT and during a current clock cycle of a clock signal of the DUT, the first FPGA emulates a partition of the DUT and generates multiple signals that are intended for the second FPGA. The first FPGA identifies 802 the signals and determines 804 for which of the signals a signal event has occurred during the current clock cycle. The first FPGA transmits 806 a packet to the second FPGA indicating for which of the signals a signal event has occurred. Additionally, for each of the signals for which a signal event occurred, the first FPGA transmits 808 a packet to the second FPGA. The first FPGA also transmits 810 to a clock generator an indication to modify the clock signal of the DUT. For example, the first FPGA may indicate that the clock generator generates the next clock cycle for the clock signal.

Figure 9:
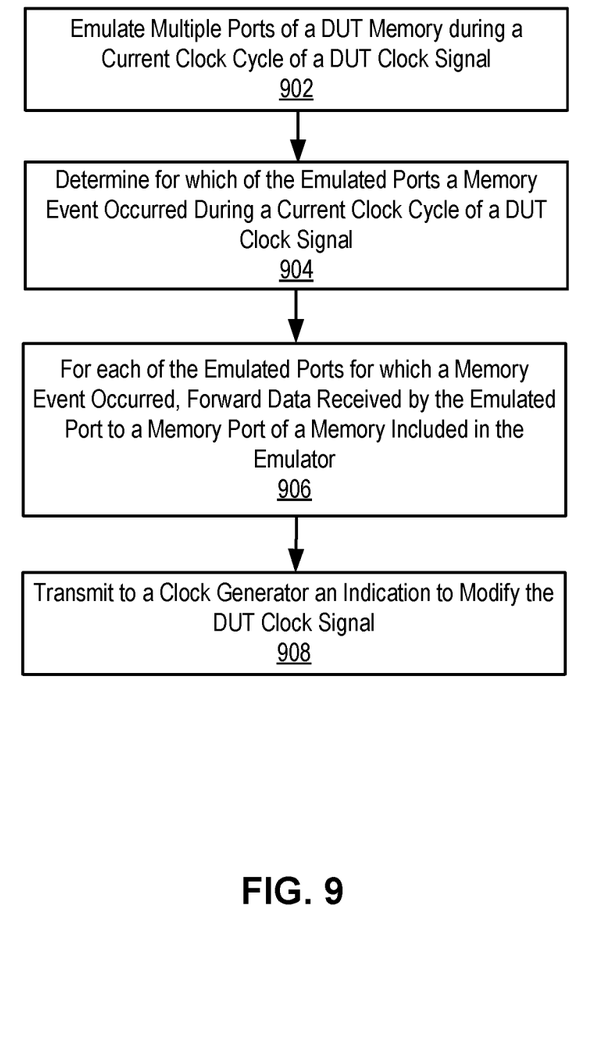
FIG. 9 is a flow chart of a process for emulating a memory, according to one embodiment.

FIG. 9 is a flow chart of a process for the emulator 120 to emulate a memory included in a DUT (DUT memory), according to one embodiment. Other embodiments can perform the steps of FIG. 9 in different orders. Moreover, other embodiments can include different and/or additional steps than the ones described here.

Assume for purposes of this example that the DUT memory includes a number of memory ports and that the emulator includes a memory (emulator memory) with less memory ports than those of the DUT memory. The emulator 120 emulates 902 multiple ports of the DUT memory during a current clock cycle of a clock signal of the DUT. The number of emulated ports is the same as the number of memory ports of the DUT memory.

The emulator 120 determines 904 for which of the emulated ports a memory event occurred during the current clock cycle. For each of the emulated ports for which a memory event occurred, the emulator 120 forwards 906 data received by the emulated port to a memory port of the emulator memory. After forwarding the data, the emulator transmits 908 to a clock generator an indication to modify the DUT clock signal.

Computing Machine Architecture

Figure 10:
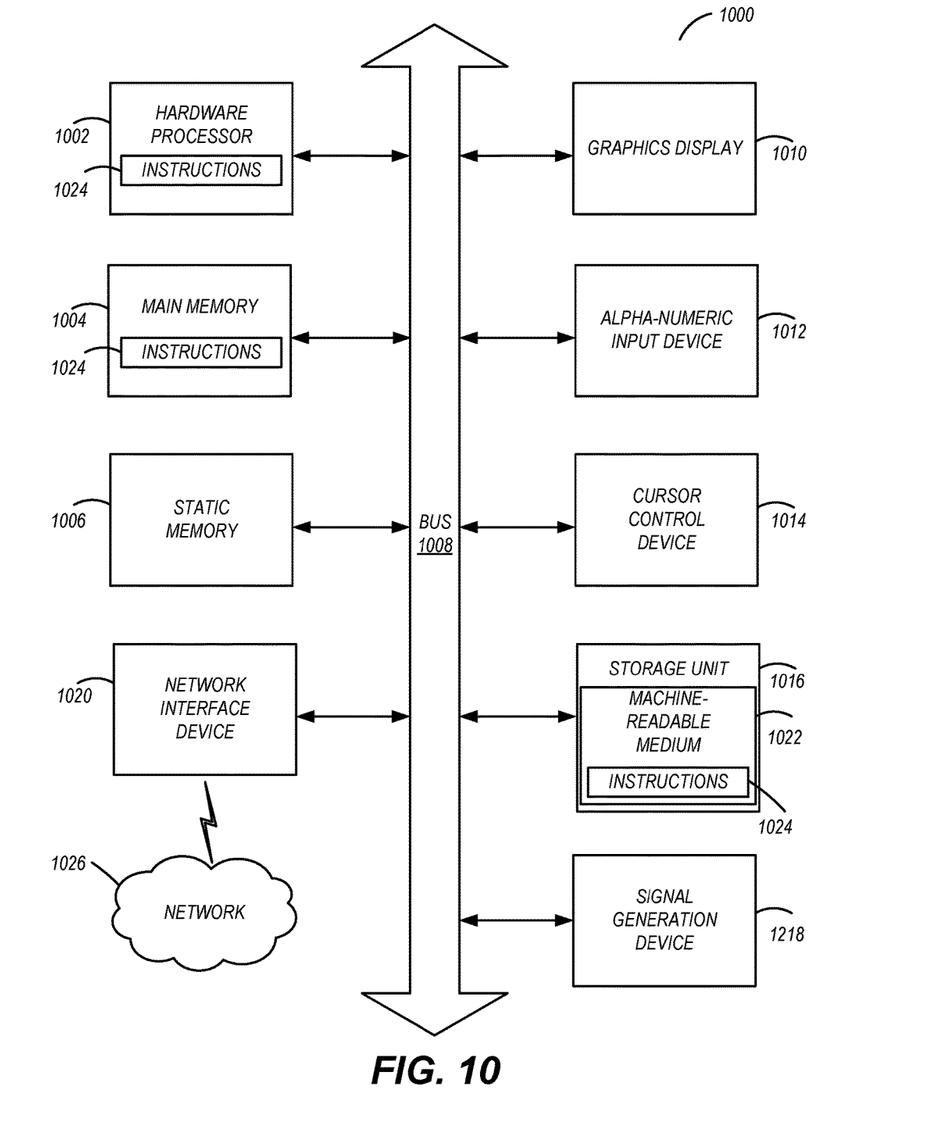
FIG. 10 is a block diagram illustrating components of an example machine able to read instructions from a machine-readable medium and execute them in a processor, according to one embodiment.

Turning now to FIG. 10, it is a block diagram illustrating components of an example machine able to read instructions from a machine-readable medium and execute them in a processor (or controller). Specifically, FIG. 10 shows a diagrammatic representation of a machine in the example form of a computer system 1000 within which instructions 1024 (e.g., software or program code) for causing the machine to perform (execute) any one or more of the methodologies described with FIGS. 1-9. The computer system 1000 may be used for one or more of the entities (e.g., host system 110, emulator 120) illustrated in the emulation environment 100 of FIG. 1.

The example computer system 1000 includes a hardware processor 1002 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 1004, and a static memory 1006, which are configured to communicate with each other via a bus 1008. The computer system 1000 may further include graphics display unit 1010 (e.g., a plasma display panel (PDP), a liquid crystal display (LCD), a projector, or a cathode ray tube (CRT)). The computer system 1000 may also include alphanumeric input device 1012 (e.g., a keyboard), a cursor control device 1014 (e.g., a mouse, a trackball, a joystick, a motion sensor, or other pointing instrument), a storage unit 1016, a signal generation device 1018 (e.g., a speaker), and a network interface device 1020, which also are configured to communicate via the bus 1008.

The storage unit 1016 includes a machine-readable medium 1022 which stores instructions 1024 (e.g., software) embodying any one or more of the methodologies or functions described herein. The instructions 1024 (e.g., software) may also reside, completely or at least partially, within the main memory 1004 or within the processor 1002 (e.g., within a processor's cache memory) during execution thereof by the computer system 1000, the main memory 1004 and the processor 1002 also constituting machine-readable media. The instructions 1024 (e.g., software) may be transmitted or received over a network 1026 via the network interface device 1020.

While machine-readable medium 1022 is shown in an example embodiment to be a single medium, the term "machine-readable medium" should be taken to include a single medium or multiple media (e.g., a centralized or distributed database, or associated caches and servers) able to store instructions (e.g., instructions 1024). The term "machine-readable medium" shall also be taken to include any medium that is capable of storing instructions (e.g., instructions 1024) for execution by the machine and that cause the machine to perform any one or more of the methodologies disclosed herein. The term "machine-readable medium" includes, but not be limited to, data repositories in the form of solid-state memories, optical media, and magnetic media.

As is known in the art, a computer system 1000 can have different and/or other components than those shown in FIG. 10. In addition, the computer system 1000 can lack certain illustrated components. For example, a computer system 1000 acting as the emulator 120 may include one or more hardware processors 1002, multiple storage units 1016, a network interface device 1020, and multiple configurable logic circuits (as described above with reference to FIG. 1), among other components, but may lack an alphanumeric input device 1012 and a cursor control device 1014. For another example, a computer system 1000 acting as a host system 110 may include one or more hardware processors 1002. The host system 110 with multiple processors 1002 may perform multiple tasks in parallel on multiple threads, processes and/or machines.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIGS. 1-10. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software (or computer program code)) may be driven by cost and time considerations.

The various operations of example methods described herein may be performed, at least partially, by one or more processors, e.g., processor 1002, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for efficient event detection of a digital circuit through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. An emulator component comprising:
   one or more event detectors configured to:
   receive a plurality of signals generated based on an emulation of a design under test (DUT); and
   determine for which of the plurality of signals a signal event occurred;
   a controller configured to select signals, from the plurality of signals, for which a signal event occurred; and
   a multiplexer configured to:
   output one or more identifiers of the selected signals; and
   output at least the selected signals.

2. The emulator component of claim 1, wherein a signal from the selected signals has a first state in response to a first clock event and a second state in response to a second clock event, the one or more event detectors are further configured to:
   determine, in response to the second clock event, that a signal event occurred for the signal based on the first state being different than the second state.

3. The emulator component of claim 1, wherein the emulator component is a field programmable gate array.

4. The emulator component of claim 1, wherein the multiplexer outputs the selected signals in response to a clock event of a clock signal and wherein the controller is further configured to:
   output an additional signal in response to the multiplexer outputting the selected signals, wherein the additional signal is an indication to modify the DUT clock signal.

5. The emulator component of claim 4, wherein a clock generator unit controls the clock signal based on the additional signal.

6. The emulator component of claim 1, wherein a receiving unit receives the one or more identifiers and the selected signals output by the multiplexer and changes a state of at least one selected signal.

7. The emulator component of claim 1, further comprising:
   an additional multiplexer configured to output an additional plurality of signals generated based on the emulation of the DUT, the additional plurality of signals not analyzed by the one or more event detectors.

8. A method for emulating a design under test (DUT), the method comprising:
   receiving, by an event detector, a plurality of signals generated based on an emulation of the DUT;
   determining, by the event detector, for which of the plurality of signals a signal event occurred;
   selecting, by a controller, the signals from the plurality of signals for which a signal event occurred; and
   outputting, by a multiplexer, one or more identifiers of the selected signals and at least the selected signals.

9. The method of claim 8, wherein a signal of the selected signals has a first state in response to a first clock event and a second state in response to a second clock event, the method further comprising:
   determining, in response to the second clock event, that a signal event occurred for the signal based on the first state being different than the second state.

10. The method of claim 8, wherein the event detector, the controller, and the multiplexer are implemented on a field programmable gate array.

11. The method of claim 8, wherein the multiplexer outputs the selected signals in response to a clock event of a clock signal, the method further comprising:
   outputting an additional signal in response to the multiplexer outputting the selected signals, wherein the additional signal is an indication to modify the DUT clock signal.

12. The method of claim 11, further comprising controlling, by a clock generator unit, the clock signal based on the additional signal.

13. The method of claim 8, further comprising receiving, by a receiving unit, the one or more identifiers and the selected signals output by the multiplexer and changing a state of at least one selected signal.

14. The method of claim 8, further comprising:
   outputting, by a second multiplexer, an additional plurality of signals generated based on the emulation of the DUT, the additional plurality of signals not analyzed by the event detector.

15. A non-transitory computer readable storage medium storing instructions, the instructions when executed by at least one processor cause the processor to configure a field programmable gate array (FPGA) to implement an emulator component, the executed instructions cause the processor to configure the FPGA to:
   implement one or more event detectors configured to:
      receive a plurality of signals generated based on an emulation of a design under test (DUT); and
      determine for which of the plurality of signals a signal event occurred;
   implement a controller configured to select signals, from the plurality of signals, for which a signal event occurred; and
   implement a multiplexer configured to:
      output one or more identifiers of the selected signals; and
      output at least the selected signals.

16. The non-transitory computer readable medium of claim 15, wherein a signal of the selected signals has a first state in response to a first clock event and a second state in response to a second clock event, and the one or more event detectors are further configured to:
   determine, in response to the second clock event, that a signal event occurred for the signal based on the first state being different than the second state.

17. The non-transitory computer readable medium of claim 15, wherein the multiplexer is further configured to output the selected signals in response to a clock event of a clock signal, and wherein the controller is further configured to output an additional signal in response to the multiplexer outputting the selected signals, wherein the additional signal is an indication to modify the DUT clock signal.

18. The non-transitory computer readable storage medium of claim 17, wherein instructions for execution further cause the processor to configure the FPGA to implement a clock generator unit configured to control the clock signal based on the additional signal.

19. The non-transitory computer readable storage medium of claim 15, wherein instructions for execution further cause the processor to configure the FPGA to implement a receiving unit configured to receive the one or more identifiers and the selected signals output by the multiplexer and change a state of at least one selected signal.

20. The non-transitory computer readable storage medium of claim 15, wherein instructions for execution further cause the processor to configure the FPGA to implement an additional multiplexer configured to output an additional plurality of signals generated based on the emulation of the DUT, the additional plurality of signals not analyzed by the one or more event detectors.

* * * * *